Oct. 23, 1956 G. A. LYON Re. 24,229

WHEEL COVER

Original Filed Dec. 28, 1949

Inventor
GEORGE ALBERT LYON by The firm of Charles Shlitt Attys.

United States Patent Office

Re. 24,229
Reissued Oct. 23, 1956

24,229

WHEEL COVER

George Albert Lyon, Detroit, Mich.

Original No. 2,690,357, dated September 28, 1954, Serial No. 135,467, December 28, 1949. Application for reissue April 16, 1956, Serial No. 578,553

10 Claims. (Cl. 301—37)

Matter enclosed in heavy brackets [ ] appears in the original patent but forms no part of this reissue specification; matter printed in italics indicates the additions made by reissue.

The present invention relates to improvements in wheel structure and particularly concerns improvements in the ornamentation and protection of the outer sides of vehicle wheels by means of novel cover structure.

An important object of the present invention is to provide an improved wheel structure having removable cover means at the outer side thereof.

Another object of the invention is to provide an improved wheel cover assembly wherein a novel trim ring structure is arranged to be mounted in self-retaining relation on the outer side of the wheel.

A further object of the invention is to provide a novel cover structure for the outer side of a vehicle wheel including improved means for retaining engagement of the cover with the tire rim of the wheel.

Yet another object of the invention is to provide an improved trim ring structure adapted to be mounted in association with a centrally mounted hub cap on a wheel and with the trim ring in self-retaining association with the tire rim of the wheel.

According to the general features of the present invention there is provided in a wheel structure including a wheel body and a multi-flange tire rim having a generally axially outwardly projecting terminal flange, a wheel cover assembly including a circular cover member having its outer margin in closely adjacent relation to the terminal flange of the tire rim, said outer margin having an axially inwardly extending flange of a diameter to lie in assembly in radially inwardly spaced relation to the tire rim terminal flange and having a plurality of generally radially and axially outwardly extending short and stiff retaining fingers grippingly engaging with the inner face of the terminal flange and releasable by radial flexure of the axially extending flange upon the application of a pry-off tool to the outer margin of the cover intermediate said retaining fingers.

According to other general features of the invention there is provided in a wheel cover adapted to be applied to the outer side of a wheel having thereon a hub cap and including a multi-flange tire rim having a terminal flange, an annular cover member having an inner margin arranged to rest against the crown portion of the hub cap and having an outer margin arranged for substantial concealing relation to the tire rim and formed at its outer margin with a generally axially extending flange structure arranged to lie generally parallel at the inside of the tire rim terminal flange and including radially and axially outwardly extending short retaining finger means grippingly engageable with the inner face of the terminal flange.

Other objects, features and advantages of the present invention will be readily apparent from the following detailed description of a preferred embodiment taken in conjunction with the accompanying drawings in which.

As shown on the drawings.

Figure 2:
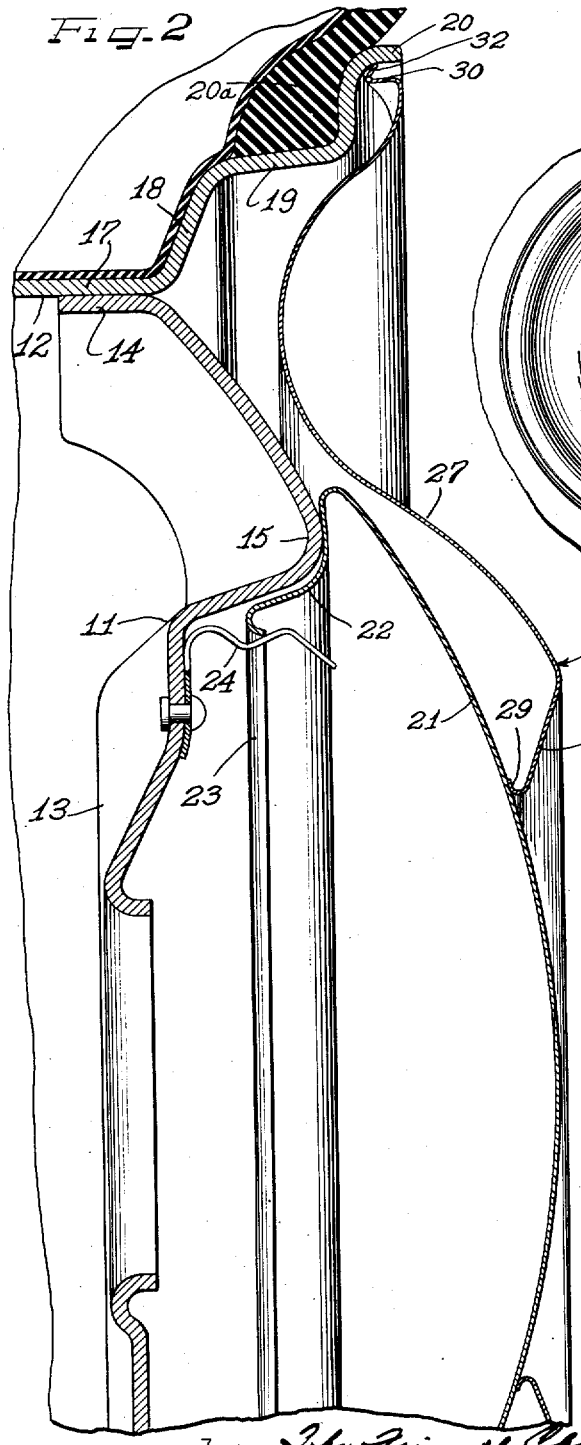
Figure 2 is a diametrical sectional view taken substantially on the line II—II of Figure 1.
Figure 1:
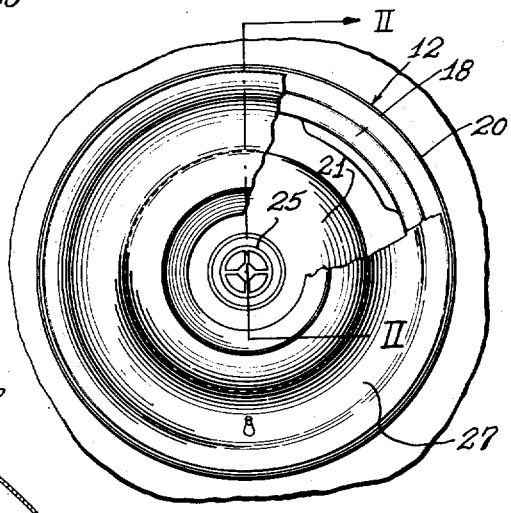
Figure 1 is a side elevational view of a vehicle wheel showing a cover according to the present invention applied to the outer side thereof.
Figure 3:
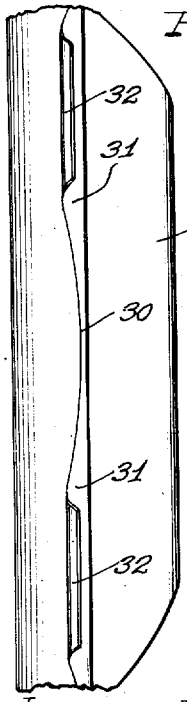
Figure 3 is a fragmentary edge elevational view of the cover of the present invention.

According to the present invention a cover assembly 10 is arranged to be applied in protective, ornamental relation to the other side of a vehicle wheel including a wheel body 11 and a tire rim 12. The wheel body is preferably formed as a stamping from appropriate gage sheet metal and comprises a central bolt-on flange 13, a radially outer marginal attachment flange 14 and an intermediate annular axially outwardly extending reinforcing nose bulge 15. The tire rim 12 is formed in a suitable fashion such as by an appropriate rolling process from appropriate gage sheet metal and includes a base flange 17 to which the attachment flange 14 of the wheel body is appropriately secured, a side flange 18, an intermediate flange 19 and a terminal flange 20. The flanges of the tire rim are formed in the conventional drop center style adapted to support a tire and tube assembly 20a.

The wheel cover assembly 10 includes a hub cap 21 which may be of more or less standard shape including a large convex crown, a side flange 22 turned under and inwardly and terminating in a turned retaining flange 23 cooperating with spring clips 24 attached to the bolt-on flange 13 for retaining the hub cap in seated relation on the nose bulge 15. If desired the center outer face of the hub cap crown may be provided with any appropriate applied or impressed medallion or other indicia 25, identifying the make of automobile with which the hub cap is being used, or the like.

The cover assembly 10 also includes a trim ring member 27 which is of generally ogee cross-section generally simulative of the outer side of the wheel and extending from the terminal flange 20 to and into overlapping relation with the hub cap 21. The radially outer portion of the annular cover member 27 extends axially inwardly into the relatively large axially outwardly opening groove defined between the outer portions of the tire rim and the nose bulge portion 15 of the wheel cover, while a radially inner portion of the annular cover member overlies the radially outer marginal portion of the hub cap crown and has a generally radially and axially inwardly extending more or less frusto-conical flange 28 terminating in an underturned beaded and reinforced edge 29 which rests against the hub cap crown and is of a diameter to expose the central portion of the crown including the medallion 25.

According to the present invention the annular cover member 27 is self-retaining on the wheel and for this purpose has the outer margin thereof formed with a generally axially inwardly extending, cylindrical flange 30 which is of a smaller diameter than the terminal flange 20 of the tire rim but in assembly lies in relatively closely spaced relation thereto. The flange 30 has a plurality of generally axially inwardly extending relatively wide and tapered extensions 31 which terminate in short generally radially and axially outwardly extending terminal flanges 32 which are of a tip extent or of a diameter slightly greater than the inner face of the tire rim terminal flange 20 so that in assembly the tips of the terminal flanges 32 engage retainingly in gripping retaining relation with the inner surface of the tire rim terminal flange 20. As best seen in Fig. 2, the tip or terminal portion of the terminal flange 20 may extend generally cylindrically and therefore the retaining gripping engagement of the tips of the terminal retaining flanges or fingers 32 effects a thorough retention of the cover on the wheel. By reason of the fact that the flange 30 is continuous around the perimeter of the cover each of the retaining finger extensions 31 is equally stressed upon application of the cover and radial inward stress on the short and stiff retaining finger terminal flanges 32. Since the terminal finger extensions 31 are quite short, preferably being not longer than the terminal portion of the terminal flange 20 a high degree of resilience is attained.

By having the retaining finger portions 31 and the remainder of the flange 30 in radially inwardly spaced relation to the inner surface of the terminal flange 20, a pry-off tool can readily be applied between the margin of the cover and the terminal flange for prying the cover free from the tire rim. Upon applying the pry-off tool into the gap between the edge of the annular cover member 27 and the tire rim terminal flange 20, and applying pry-off force, the retaining fingers are stressed and the cover is moved slightly diametrically away from the portion of the tire rim at which the pry-off force is applied so that the adjacent retaining fingers are relaxed and will slide outwardly on the terminal flange. By applying the pry-off force at successive places along the margin of the cover, the cover is gradually pried free from the wheel.

In applying the annular cover member 27 to the wheel, it is generally centered with respect to the tire rim flange 20 and is pressed inwardly, the *finger extensions 31* [retaining fingers 30] stressing inwardly as the retaining terminal flanges 32 engage with the inner surface of the terminal flange 20.

The arrangement of the annular cover member 27 is preferably such that before the retaining *finger extensions 31* [fingers 30] are pressed fully inwardly, the engagement margin 29 at the inner edge of the annular cover member engages against the crown of the hub cap 21 and upon further axial movement of the annular cover member, the annular cover member is placed under stress against the hub cap to retain the same against rattling.

It will thus be apparent that the present cover assembly is adapted to be applied either to a new automobile at the factory or the annular cover member 27 may be applied to an existing automobile as an accessory, utilizing the existing hub cap and cooperating with the hub cap in assembly to provide an attractive, protective, ornamental cover for substantially the entire outer side of the vehicle wheel.

The gap between the directly axially extending marginal flange 30 and the terminal flange 20 and the spaces afforded by the recesses or cutbacks in the edge of flange 30 afford liberal passage for air circulation from behind the cover and through the usual wheel openings for brake drum cooling purposes.

It will be understood that modifications and variations may be effected without departing from the scope of the novel concepts of the present invention.

I claim as my invention:

1. In a wheel structure including a wheel body and a multi-flange tire rim having a generally axially outwardly projecting terminal flange, a wheel cover assembly including a circular cover member having its outer margin in closely adjacent relation to the terminal flange of the tire rim, said outer margin having an axially inwardly extending flange of a diameter to lie in assembly in radially inwardly spaced relation to the tire rim terminal flange and having a plurality of generally radially and axially outwardly extending short and stiff retaining fingers grippingly engaging with the inner face of the terminal flange and releasable by radial flexure of the axially extending flange upon the application of a pry-off tool to the outer margin of the cover intermediate said retaining fingers, said marginal cover flange being of approximately the same overall width as said terminal flange so that the outer side of the edge of the cover lies not substantially outside of the plane of the tip of said terminal flange and is protected thereby against curbing and like damage.

2. In a wheel structure including a body portion and a tire rim including a generally axially outwardly extending terminal flange, a hub cap retained upon the wheel body, and an annular cover member having an inner margin retainingly overlapping the margin of the crown of the hub cap, said annular cover member having a series of axially inwardly extending retaining fingers having generally axially and radially outwardly projecting short terminal flanges retainingly engaging the tire rim terminal flange, the inner margin of the annular cover member being maintained under stress against the crown of the hub cap by the interengagement of the retaining fingers with the tire rim terminal flange.

3. In a wheel structure including a body portion and a tire rim including a generally axially outwardly extending terminal flange, a hub cap retained upon the wheel body, and an annular cover member having an inner margin retainingly overlapping the margin of the crown of the hub cap, said annular cover member having a series of axially inwardly extending retaining fingers having generally axially and radially outwardly projecting short terminal flanges retainingly engaging the tire rim terminal flange, the inner margin of the annular cover member being maintained under stress against the crown of the hub cap by the interengagement of the retaining fingers with the tire rim terminal flange, said retaining fingers being of substantially the same length as the depth of the inner face of the terminal flange.

4. In a wheel structure including a wheel body and a tire rim, the tire rim having a terminal flange extending generally axially outwardly and having a substantially cylindrical inner face, a circular cover member disposed in substantial covering relation to the outer side of the wheel and having an outer marginal formation fitting inside of the terminal flange and including a plurality of generally axially inwardly extending retaining fingers of a length substantially equal to the depth of the inner face of the terminal flange and having short generally radially and axially outwardly extending retaining finger terminal flanges grippingly engaging endwise against the inner face of the tire rim terminal flange, the extreme axially outward extent of said cover outer marginal formation being substantially within the plane of the tip of the tire rim terminal flange so as to be protected thereby against curbing or like damage in service.

5. In a wheel structure including a wheel body and a tire rim having a generally axially outwardly extending terminal flange, a circular wheel cover in covering relation to the outer side of the wheel and having an outer margin lying in radially inwardly spaced relation to and substantially in the plane of the tip of said terminal flange to afford a gap with said tip, said cover margin including generally axially extending retaining fingers lying on a circumference spaced from the inner face of the tire rim and formed with generally radially and axially outwardly extending retaining terminal flange extremities retainingly engaging endwise against the inner side of the tire rim terminal flange to retain the cover in place, the gap between the outer margin of the cover member and the tire rim terminal flange tip affording access to a pry-off tool in prying the cover free from the wheel.

6. In a wheel structure including a hub cap and a multi-flange tire rim having a terminal flange, an annular cover member having an inner margin arranged to rest against the outer side of the crown portion of the hub cap and having an outer margin arranged for substantial concealing relation to the tire rim and formed at its outer margin with a generally axially extending flange structure arranged to lie generally parallel at the inside of the tire rim terminal flange and including radially and axially outwardly extending short retaining finger means grippingly engageable with the inner face of the terminal flange.

7. In a wheel structure including a tire rim and a wheel body attached to the tire rim and affording therewith wheel openings for ventilation purposes, the tire rim having a generally angular terminal flange structure including a portion extending generally axially outwardly and a portion extending generally radially inwardly, a cover for the outer side of the wheel including an outer marginal portion for substantially concealing the tire rim and having an axially inwardly extending narrow marginal flange not substantially wider than the axially extending portion of the terminal flange, said cover flange having generally axially and radially outwardly extending short terminal gripping portions engaging retainingly against the inner side of said axially extending terminal flange portion, said cover flange having intermediate the gripping terminal portions cut back *recessed portions* [recesses] in the inner edge of the flange to afford air circulation passages from behind the cover through the cover flange past said radially extending portion of the tire rim terminal flange, *said cut back recessed portions being generally circumferentially arcuate between said gripping portions.*

8. In a wheel structure including a tire rim having a radially outer terminal flange, a supporting member for the rim and a detachable hub cap at the center of the supporting member, an annular wheel cover having an outer peripheral margin terminating in an inwardly extending cover retaining flange including an axially inwardly extending continuous flange portion, said flange portion being recessed at spaced intervals and having resiliently yieldable finger extension portions alternating with the recesses and each of which is formed into a radially outwardly extending element for tensioned resilient retaining engagement with said terminal flange, said cover having a radially inner turned edge for bottoming against said hub cap when the cover is on the wheel.

*9. In a wheel structure including a tire rim and a wheel body attached to the tire rim and the tire rim having a generally angular terminal flange structure including a portion extending generally radially inwardly and an outer comparatively narrow terminal lip portion extending axially outwardly, a circular cover for the outer side of the wheel including an outer marginal portion for substantially concealing the tire rim and having an axially inwardly extending narrow marginal flange substantially coextensive in width with the width of said axially extending terminal lip portion, said cover flange having generally axially and radially outwardly extending short terminal gripping portions engaging retainingly against the radially inner side of said axially extending terminal lip portion and provided between said grpping terminal portions with transverse cut back recessed portions having lateral side edges oppositely inclined toward adjoining gripping portions.*

*10. In a wheel structure a wheel including a central supporting wheel body and a flanged tire rim attached thereto having at its axially outer side a generally angular terminal flange structure including a first portion extending generally radially inwardly and a comparatively narrow terminal lip portion having a generally axially outwardly extending surface facing but at a substantial angle to said first portion and a circular cover for disposition on the outer side of the wheel including an outer marginal portion for substantially concealing the tire rim and having an axially inwardly extending narrow marginal flange inside of and generally paralleling said axial lip surface, said cover flange having generally axially and radially outwardly extending relatively short stiff terminal gripping portions engaging retainingly against said axial lip surface, said cover flange having at least its inner edge provided with cuts transversely between said gripping terminal portions, said terminal gripping portions merging at opposite sides in oppositely inclined flange portions at the extremities of said transverse cuts.*

References Cited in the file of this patent or the original patent

UNITED STATES PATENTS

| | | |
|---|---|---|
| Re. 19,467 | Lyon | Feb. 12, 1935 |
| 1,944,658 | Griffith | Jan. 23, 1934 |
| 2,102,471 | Lyon | Dec. 14, 1937 |
| 2,368,228 | Lyon | Jan. 30, 1945 |
| 2,368,238 | Lyon | Jan. 30, 1945 |
| 2,383,071 | Mulhern | Aug. 21, 1945 |
| 2,404,389 | Lyon | July 23, 1946 |
| 2,404,390 | Lyon | July 23, 1946 |
| 2,421,383 | Lyon | June 3, 1947 |